US011928902B2

United States Patent
Zhao et al.

(10) Patent No.: US 11,928,902 B2
(45) Date of Patent: Mar. 12, 2024

(54) METHOD AND DEVICE FOR SITUATION-BASED PROCESSING OF SENSOR DATA FROM A MOTOR VEHICLE

(71) Applicant: Robert Bosch GmbH, Stuttgart (DE)

(72) Inventors: Leon Zhao, Suzhou (CN); Benneth Sturm, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/369,482

(22) Filed: Jul. 7, 2021

(65) Prior Publication Data

US 2022/0036668 A1 Feb. 3, 2022

(30) Foreign Application Priority Data

Jul. 20, 2020 (CN) .......................... 202010697237.5

(51) Int. Cl.
*G07C 5/08* (2006.01)
*G08G 1/16* (2006.01)
*G06V 20/58* (2022.01)
*G06V 40/10* (2022.01)

(52) U.S. Cl.
CPC ............. *G07C 5/0808* (2013.01); *G08G 1/16* (2013.01); *G06V 20/584* (2022.01); *G06V 40/10* (2022.01)

(58) Field of Classification Search
CPC ........ G07C 5/0808; G08G 1/16; G08G 1/166; G06V 20/584; G06V 40/10; G06V 10/96; G06V 20/58; B60R 16/023
See application file for complete search history.

(56) References Cited

U.S. PATENT DOCUMENTS

| 8,370,392 B1* | 2/2013 | Hunt | H04L 67/06 707/791 |
| 2013/0222115 A1* | 8/2013 | Davoodi | H04Q 9/00 340/10.1 |
| 2016/0196231 A1* | 7/2016 | Quach | G06F 11/3433 710/307 |
| 2016/0277661 A1* | 9/2016 | Brav | H04N 23/80 |
| 2017/0285165 A1* | 10/2017 | Khlifi | G01S 13/931 |
| 2018/0013635 A1* | 1/2018 | Acharya | H04L 67/303 |
| 2018/0069933 A1* | 3/2018 | Chandra | H04L 67/5651 |
| 2019/0204076 A1* | 7/2019 | Nishi | G01B 21/04 |
| 2019/0297025 A1* | 9/2019 | Kobayashi | H04L 47/568 |
| 2020/0244479 A1* | 7/2020 | Weissenmayer | H04L 12/403 |

FOREIGN PATENT DOCUMENTS

WO WO-2016110326 A1 * 7/2016

* cited by examiner

*Primary Examiner* — Joseph J Dallo
(74) *Attorney, Agent, or Firm* — Norton Rose Fulbright US LLP (57) ABSTRACT

A method for situation-based processing of sensor data from a motor vehicle. Sensor data generated by sensors relating to the situation in the surroundings of the motor vehicle is transferred to a processing unit via a bus. The processing unit takes into account the transferred sensor data to determine an information requirement, and generates a request for additional sensor data on the basis of the determined information requirement and the load on the bus, and sends this request to the sensors. A corresponding device is also described.

10 Claims, 6 Drawing Sheets

METHOD AND DEVICE FOR SITUATION-BASED PROCESSING OF SENSOR DATA FROM A MOTOR VEHICLE

CROSS REFERENCE

The present application claims the benefit under 35 U.S.C. § 119 of China Patent Application No. CN 202010697237.5 filed on Jul. 20, 2020, which is expressly incorporated herein by reference in its entirety.

FIELD

The present invention relates to a method and device for situation-based processing of sensor data from a motor vehicle.

BACKGROUND INFORMATION

Modern motor vehicles are equipped with sensors that provide information about the instantaneous state and the driving situation of the motor vehicle, which information can be displayed to the driver or processed further by other vehicle systems. Driver assistance systems are available in the related art, for example, that use localization data for objects captured in the surroundings of the subject vehicle in order to identify a potentially hazardous driving situation, and, on identification of a hazardous situation, warn the driver, whereby an accident can be avoided. The vehicle is equipped with surround sensors for this purpose, for instance video cameras or radar, lidar or ultrasound sensors, which can monitor zones of the vehicle surroundings and provide information about objects detected in these zones. The sensor data supplied by these surround sensors can be combined into an overall picture representing a current driving situation of the subject motor vehicle. Some conventional safety systems for motor vehicles may also automatically infer a potential hazard from such sensor data, for instance take measures that warn the driver of the vehicle in order to avoid a collision, or intervene in the control of the vehicle in a way that can prevent the collision or mitigate its effect, for instance by an automatic braking maneuver.

SUMMARY

Sensor data is usually processed in a shared processing unit, for instance a central processing unit (CPU) or the like, which communicates with the individual sensors via a data bus. In order to increase the performance of the aforementioned systems, it is desirable to obtain and process the maximum possible amount of sensor data. As the number of sensors increases, so does the volume of data to be transferred and the load on the bus. The efficiency of the data transfer, however, is in turn essential to the performance of the systems that process the sensor data. Resorting to other data buses that are also present in the vehicle would result in an overload of these data buses. On the other hand, additional data buses lead to higher production costs.

An object of the present invention is to provide a method and device for situation-based processing of sensor data from a motor vehicle, which increase the efficiency of the data transfer between the sensors and the processing unit without incurring additional production costs. Indeed, an aim of the present invention is to minimize the costs overall.

This object may be achieved according to the present invention by a method and by a device in accordance with example embodiments of the present invention.

In the methods according to example embodiments of the present invention, sensor data generated by sensors relating to the situation in the surroundings of the vehicle is transferred to a processing unit via a bus. The processing unit takes into account the transferred sensor data to determine an information requirement. A request for additional sensor data is generated on the basis of this determined information requirement and the load on the bus, and is sent to the sensors.

The method according to an example embodiment of the present invention has the advantage that the processing unit can assess, on the basis of already transferred sensor data, what information is needed in order to be able to evaluate the vehicle situation sufficiently accurately, so, for example, such that a driver assistance system of the aforementioned type can work reliably. For instance, it can be decided by this means that the sensor data provided by certain sensors has precedence over other sensor data, namely that sensor data that has a high priority in assessing a potential hazard in the instantaneous driving situation or situation in the surroundings. In addition, by determining the load on the bus, it can be decided what sensor data from which sensors is to be requested with priority, so that this sensor data can subsequently be transferred preferentially to the processing unit.

The request generated by the processing unit on the basis of the current determined information requirement and the bus load therefore aims to load the bus primarily only with the sensor data relevant to assessing the situation. The data exchange can thereby be reduced as far as possible.

Advantageous example embodiments of the present invention are disclosed herein.

According to a preferred embodiment of the method according to the present invention, the sensor data is transferred cyclically to the processing unit, and the request for sensor data is generated in each cycle on the basis of an information requirement that was determined from sensor data that was transferred to the processing unit in a preceding cycle, and on the basis of the load on the bus in this preceding cycle. It can thus be decided anew from one cycle to the next, what sensor data is needed by the processing unit to assess the situation of the motor vehicle and to operate other systems. For example, it can deduced from the sensor data that has been transferred in a first cycle to the processing unit that sensor data describing the situation in the surrounding zone in front of the vehicle is needed preferentially. In a subsequent second cycle, then a request can be made only for the sensor data from the sensors that monitor this zone. In certain circumstances, specific sensor data that is of primary interest for assessing the situation is selected from the data that these sensors generate, for instance sensor data such as the number of objects detected in the surrounding zone in front of the vehicle. The load on the bus is then an additional criterion, which is taken into account in generating the request for the relevant sensor data.

Each individual sensor preferably monitors a specific zone of the vehicle surroundings. For example, the sensors may be radar sensors, lidar sensors, ultrasound sensors, a video camera or a combination thereof.

According to another preferred embodiment of the method in accordance with the present invention, the request contains a prioritization of specific sensors over other sensors such that sensor data from prioritized sensors is transferred with priority to the processing unit. If it is established when the processing unit determines the information requirement that, for instance, information from the zone of the front vehicle-surroundings is primarily relevant to assessing the situation, the request can contain a prioritization of the sensors that monitor this relevant surrounding zone.

The request also preferably contains a prioritization of specific data content of the sensor data over other data content such that prioritized data content is transferred with priority to the processing unit. Thus relevant data content is selected on the basis of the determined information requirement, and is transferred with priority, taking into account the bus load.

The sensor data also preferably contains at least the number of detected objects, and this number of detected objects constitutes a prioritized data content.

The above-described prioritization of data content of the sensor data can be combined with the prioritization of specific sensors. If, for example, it is established when determining the information requirement that the number of objects determined by the sensors monitoring the zone in front of the vehicle is primarily relevant, then only the number of detected objects is requested from the sensors monitoring this zone and is transferred to the processing unit. The term "prioritization" shall include not only the facility to transfer sensor data of higher relevance before other, less relevant sensor data, whereby an order of transfer is defined, but also the facility to transfer solely the prioritized sensor data, or the sensor data from prioritized sensors, and to dispense with transferring non-prioritized sensor data, or transferring sensor data from non-prioritized sensors.

The sensor data also preferably represents the occurrence of a specific event, and the occurrence of a specific event constitutes a prioritized data content.

According to another preferred embodiment of the method according to the present invention, vehicle data describing internal states of the motor vehicle is also taken into account in determining the information requirement. Said internal vehicle data may be, for example, data from the steering system, from the brakes, from the drive train or the like.

In addition, topographic data describing a movement space in which the motor vehicle is located is preferably also taken into account in determining the information requirement. This topographic data represents a type of map, on which the vehicle is moving, and which can contain elements that are particularly relevant to assessing the driving situation, for instance peculiarities in the course of the road, hazard points or the like.

The present invention also comprises a device for situation-based processing of sensor data from a motor vehicle, comprising a processing unit, a number of sensors for monitoring the surroundings of the motor vehicle, and a bus, which connects the sensors to the processing unit, wherein the sensors are configured to generate sensor data relating to the situation in the surroundings of the motor vehicle, and to transfer said sensor data to the processing unit via the bus, and the processing unit is suitable for taking into account the transferred sensor data to determine an information requirement, and to generate a request for additional sensor data on the basis of the determined information requirement and the load on the bus, and to send this request to the sensors.

BRIEF DESCRIPTION OF THE DRAWINGS

An exemplary embodiment of the present invention is described in more detail in the following description and is depicted in the figures.

DETAILED DESCRIPTION OF EXAMPLE EMBODIMENTS

Figure 1:
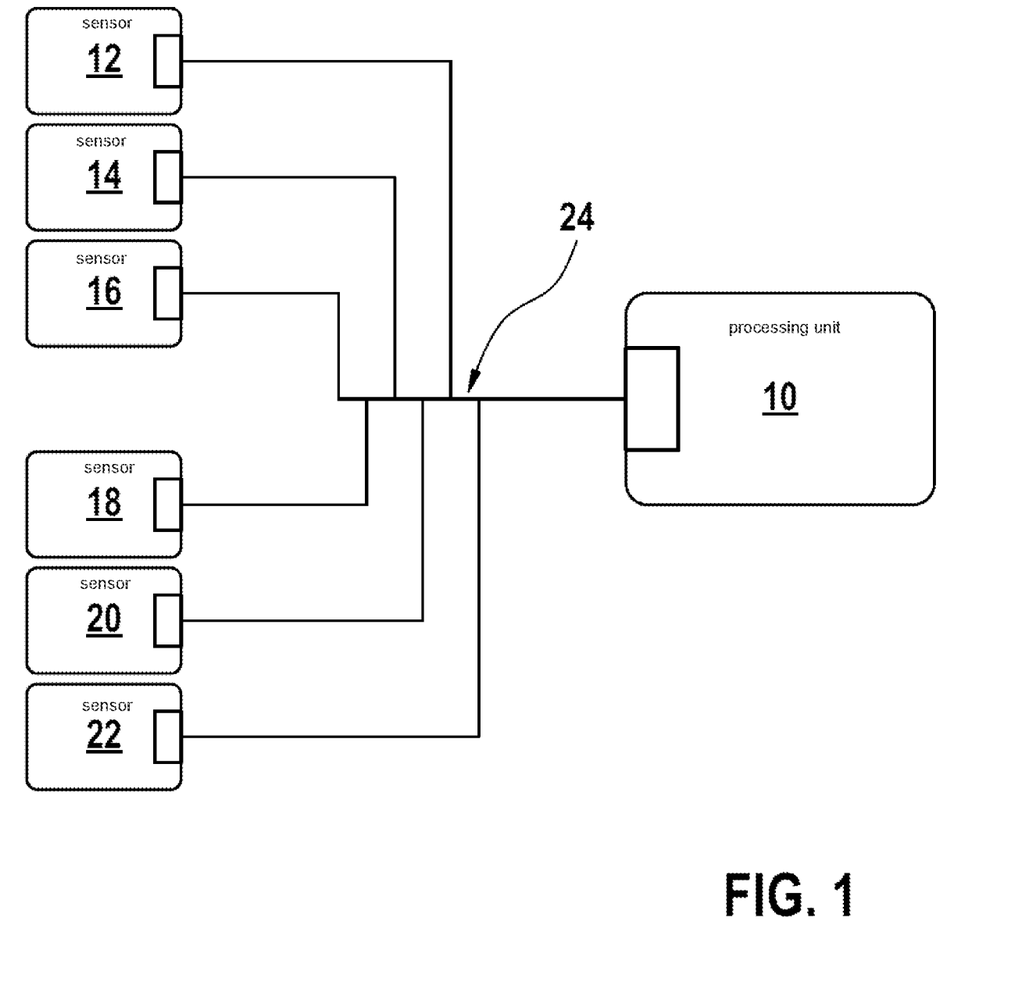
FIG. 1 is a schematic diagram of an embodiment of the device according to the present invention.

FIG. 1 is a schematic diagram of a communication structure inside a motor vehicle, comprising a processing unit 10 and a number of sensors 12, 14, 16, 18, 20, 22, which are connected via a data bus (referred to below for short as the bus 24). The sensors 12, 14, 16, 18, 20, 22 are surround sensors, which are arranged and configured to monitor a specific zone of the surroundings of the motor vehicle, which is not presented further here. Said surround sensors may be, for example, radar sensors, lidar sensors, ultrasound sensors and/or video systems for localizing objects, wherein any combination of the aforementioned types of sensors is possible.

The bus 24 may be any bus system, for instance a CAN bus, a CAN FD bus, Ethernet, FlexRay, MOST or the like. Furthermore, the bus architecture can be freely selected and is not bound to the purely schematic representation in FIG. 1. In addition, the processing unit 10 can send in the opposite direction a request for sensor data to the sensors 12, 14, 16, 18, 20, 22. This includes the facility to generate individual request commands for each one of the sensors 12, 14, 16, 18, 20, 22 and to send said request commands to these sensors. In the present exemplary embodiment, the processing unit 10 itself does not have any sensor functions, although it is possible that processing unit 10 is implemented in a sensor of the type described above. The sensors 12, 14, 16, 18, 20, 22 and the processing unit 10 are equipped with respective communication devices that allow data to be exchanged via the bus 24. In addition, the processing unit 10 may be a central main processing unit such as a central processing unit (CPU).

Figure 2:
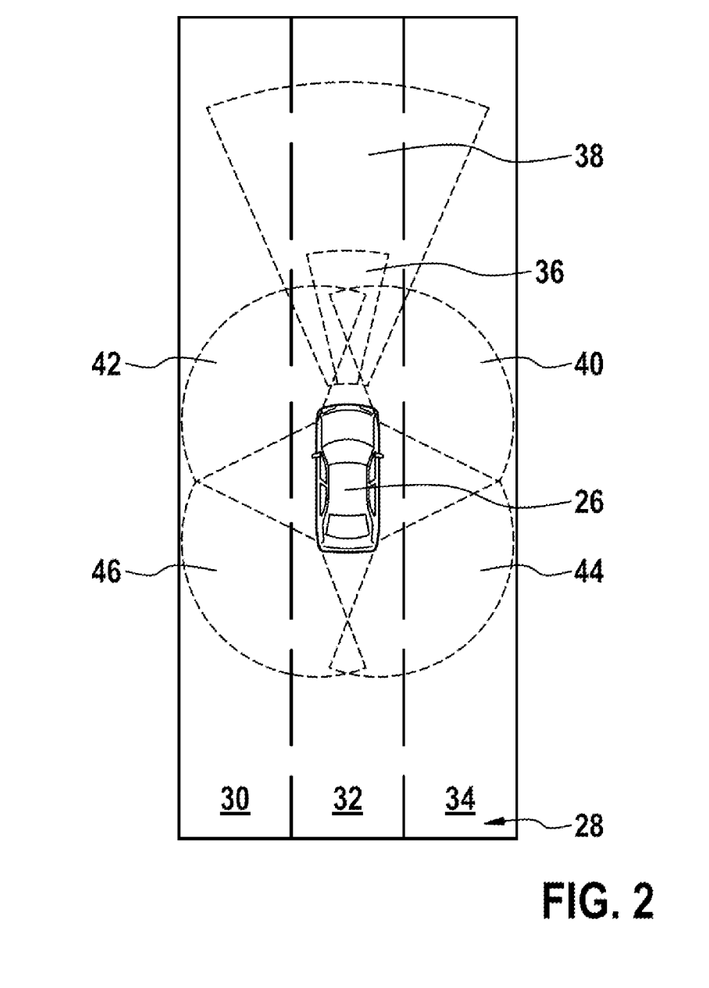
FIG. 2 is a schematic plan view of a motor vehicle, including various zones of the vehicle surroundings that are monitored by sensors.

FIG. 2 shows a motor vehicle 26 on a roadway 28 having a plurality of lanes 30, 32, 34, with the motor vehicle 26 driving in the center lane 32. The immediate zone surrounding the motor vehicle 26 is covered by the various sensors 12, 14, 16, 18, 20, 22. A sector 36 lying frontally in front of the motor vehicle 26 in the driving direction constitutes the monitoring zone of a front radar sensor, a longer sector 38 lying frontally in front of the motor vehicle 26 constitutes the monitoring zone of a front video camera, a sector 40 located to the right in front of the motor vehicle 26 constitutes the monitoring zone of a front-right radar sensor, a sector 42 located to the left in front of the motor vehicle 26 constitutes the monitoring zone of a front-left radar sensor, a rear-right sector 44 constitutes the monitoring zone of a rear-right radar sensor, and a rear-left sector 46 constitutes the monitoring zone of a rear-left radar sensor.

Figure 3:
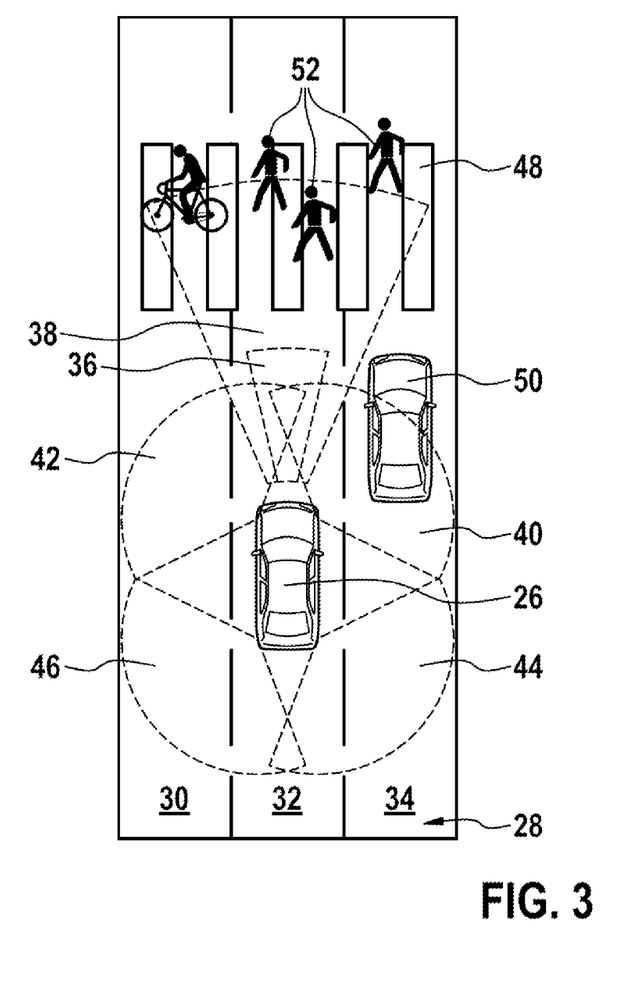
FIGS. 3 and 4 show in two different driving situations the motor vehicle depicted in FIG. 2.

FIG. 3 shows a driving situation in which a crosswalk 48 extends across the roadway 28 in front of the motor vehicle 26. In addition, diagonally right, in front of the motor vehicle 26 in the lane 34 is located a third-party vehicle 50 in the sector 40, which is captured by the front-right radar sensor and detected as an individual object. A plurality of road users 52 (pedestrians and cyclists) crossing the crosswalk 48 are located in the sector 36 of the front video camera and are detected by this camera as individual objects. The number of objects detected by a particular sensor in its monitoring zone constitutes a data content that can be transferred via the bus 24 to the processing unit 10. Other data content is also possible, for instance the occurrence of a specific event in the monitoring zone of a sensor.

Figure 4:
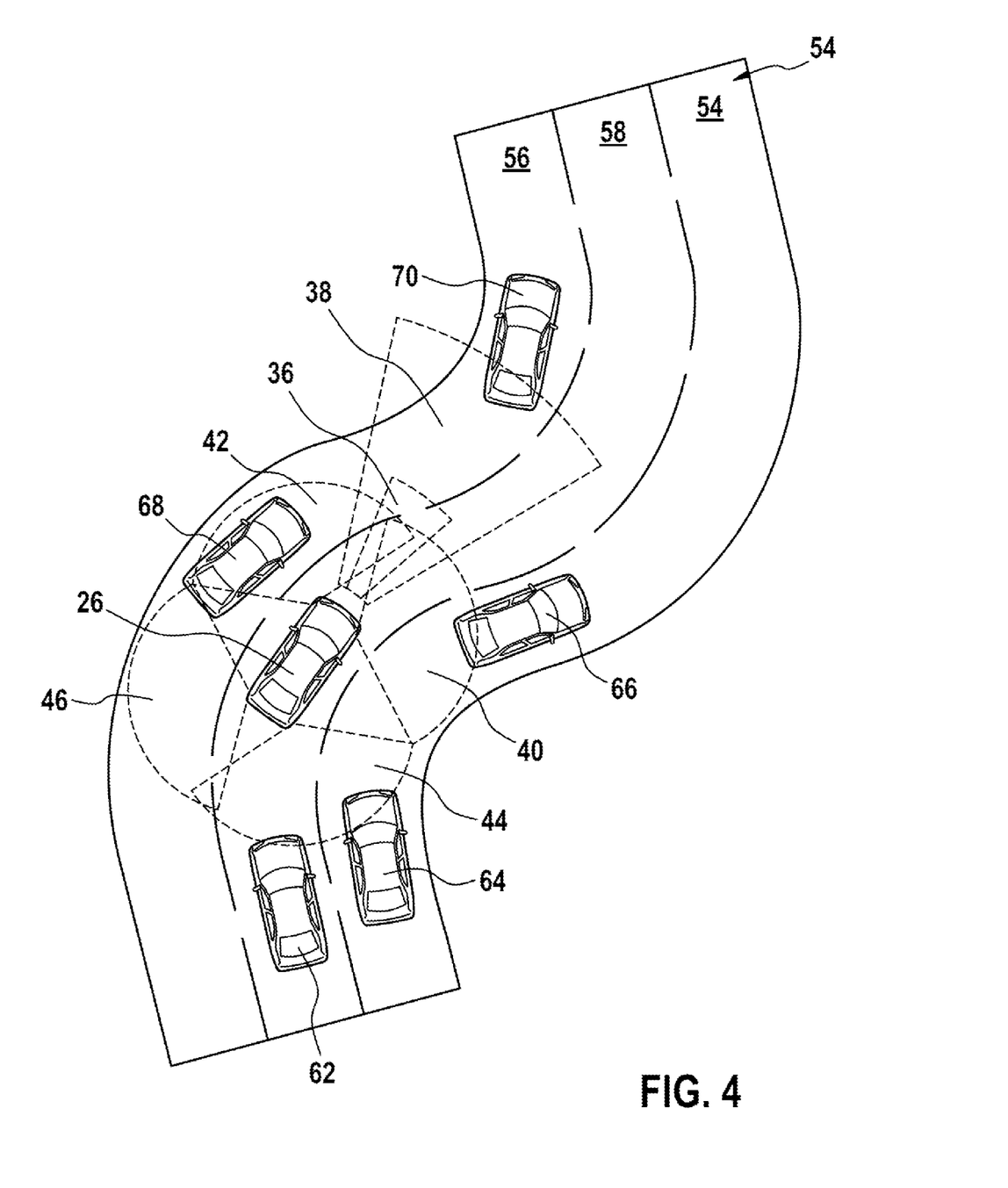

FIG. 4 shows another driving situation of the motor vehicle 26 on another roadway 54, which likewise has three lanes 56, 58, 60. Again in this case, the motor vehicle 26 is located in the center lane 58. Behind the motor vehicle 26 in the same lane 58 is located a third-party vehicle 62, and in the adjacent right-hand lane 60 behind the motor vehicle 26 is located another vehicle 64. Both vehicles 62 and 64 are captured by the rear-right radar sensor in its sector 44. Diagonally right, in front of the vehicle 26 is located a third third-party vehicle 66, which is captured by the front-right radar sensor in its sector 40, and diagonally left, in front of the motor vehicle 26 is located another vehicle 68, which is captured by the front-left radar sensor in its sector 42. A fifth third-party vehicle 70 is located in front of the subject motor vehicle 26, although in the left-hand adjacent lane 56, and therefore is captured by the front video camera in its sector 38.

Figure 5:
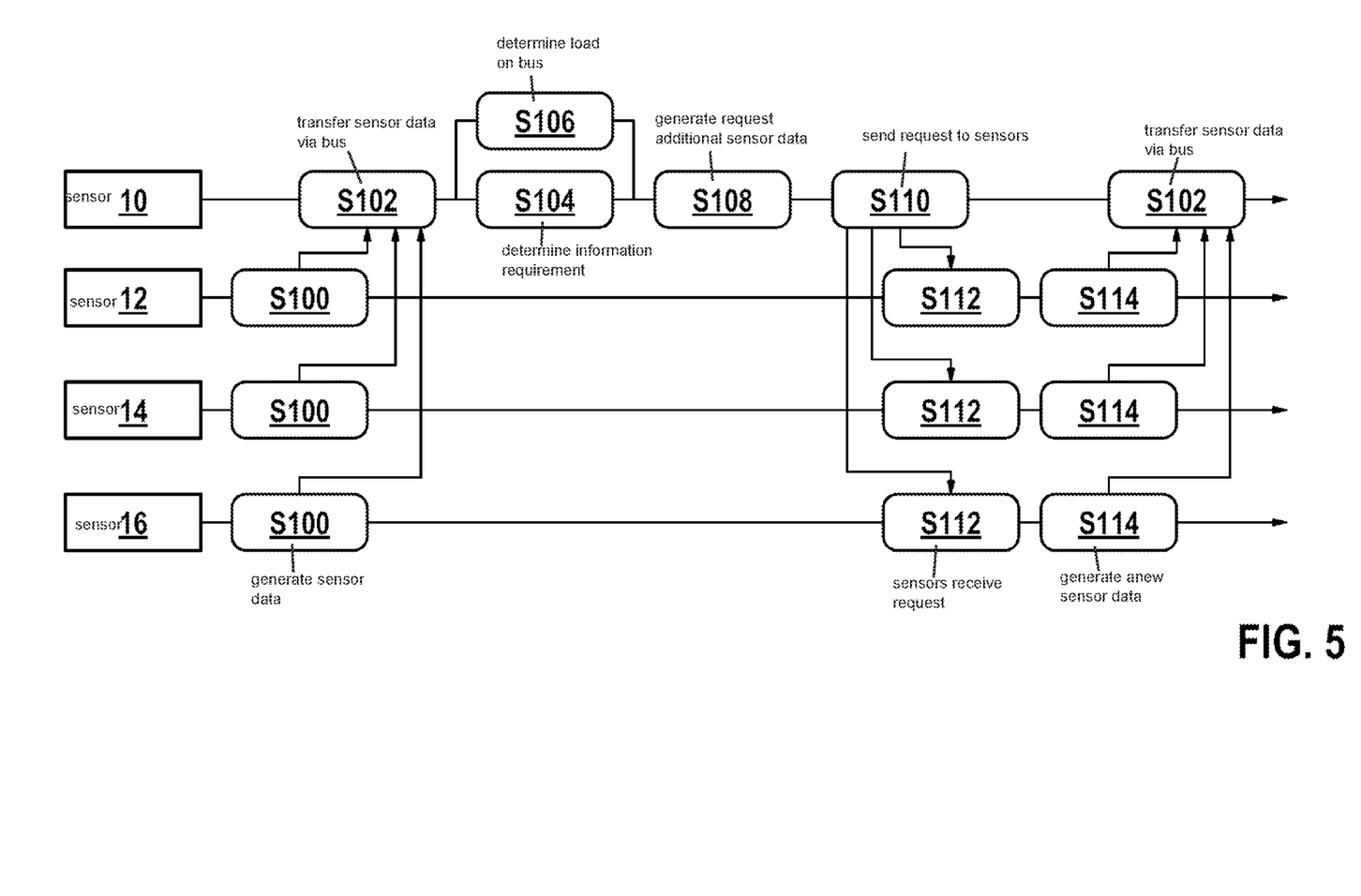
FIGS. 5 and 6 are schematic diagrams of an example sequence of the method according to example embodiment of the present invention.

FIG. 5 shows schematically the sequence of the method according to the present invention in an exemplary embodiment. The figure shows the information flow between three selected sensors 12, 14, 16 and the processing unit 10 in FIG. 1, where the sensor 12 corresponds to the front video camera, the sensor 14 corresponds to the front-right radar sensor, and the sensor 16 corresponds to the rear-right radar sensor. The information flow between the remaining sensors 18, 20, 22 from FIG. 1 and the processing unit 10 can proceed in the same manner.

The sensors 12, 14, 16 each generate sensor data relating to the situation in the surroundings of the motor vehicle (step S100). The generated sensor data is transferred via the bus 24 to the processing unit 10 (step S102).

Then, taking into account the transferred sensor data, the processing unit 10 determines an information requirement (step S104). This represents a requirement for information or data that is needed to assess the situation in the surroundings. The information requirement is thus derived from the previously transferred sensor data. In addition, the processing unit 10 determines the load on the bus 24 (step S106). The load on the bus 24 and the information requirement can be determined simultaneously.

The processing unit 10 then generates a request for additional sensor data on the basis of the determined information requirement and the determined load on the bus 24 (step S108), and sends this request to the sensors 12, 14, 16 (step S110). This request can contain for each of the individual sensors 12, 14, 16 different and specific details on what sensor data is needed from the respective sensors 12, 14, 16. The request can also comprise individual request commands that are addressed only to individual sensors of the sensors 12, 14, 16 and are read only by these sensors.

The sensors 12, 14, 16 receive the request (step S112) and in turn generate anew sensor data according to the content of the request (step S114).

Such a request can contain in particular a prioritization of one or more of the number of sensors 12, 14, 16, such that the sensor data generated by the prioritized sensor(s) 12, 14, 16 is transferred with priority to the processing unit 10. This can mean that the sensor data from the prioritized sensors 12, 14, 16 is transferred first to the processing unit 10, and then additional sensor data. It is also possible, however, to transfer to the processing unit 10 solely the sensor data from the prioritized sensors 12, 14, 16, whereas sensor data from the other sensors 12, 14, 16 is not transferred.

The request can also contain a prioritization of specific data content of the sensor data over other data content such that the prioritized data content is transferred with priority to the processing unit 10. Such prioritized data content may be, for example, the number of objects detected by the sensors 12, 14, 16. In addition, said prioritized data content may be the occurrence of a specific event detected by the sensors 12, 14, 16. Said prioritization of data content can be sent to all the sensors 12, 14, 16 involved such that all the sensors 12, 14, 16 transmit only the number of objects that each have detected to the processing unit 10 with priority over other data content.

On the basis of the received request, the sensors 12, 14, 16 thus generate additional sensor data (step S114) and transfer this sensor data via the bus 24 to the processing unit 10, with the result that the step S102 is repeated, followed by the step S104 of determining the information requirement and step S106 of determining the load on the bus 24, both steps to be performed simultaneously, and so on. The method according to the present invention can hence be performed cyclically in repetition.

FIG. 6 shows again the method depicted in FIG. 5 with reference to the driving situations shown in FIG. 3 and FIG. 4, which correspond to different situations in the surroundings. The method accordingly starts in a driving situation as shown in FIG. 3 (labeled "driving situation 1" in FIG. 6), in which the sensor 12 (the front video camera) detects a plurality of objects in its monitoring sector 36 that correspond to the road users 52 on the crosswalk 48. The sensor 14 (the front-right radar sensor) simultaneously detects the third-party vehicle 50, while the sensor 16 (the rear-right radar sensor) does not detect any object.

Figure 6:
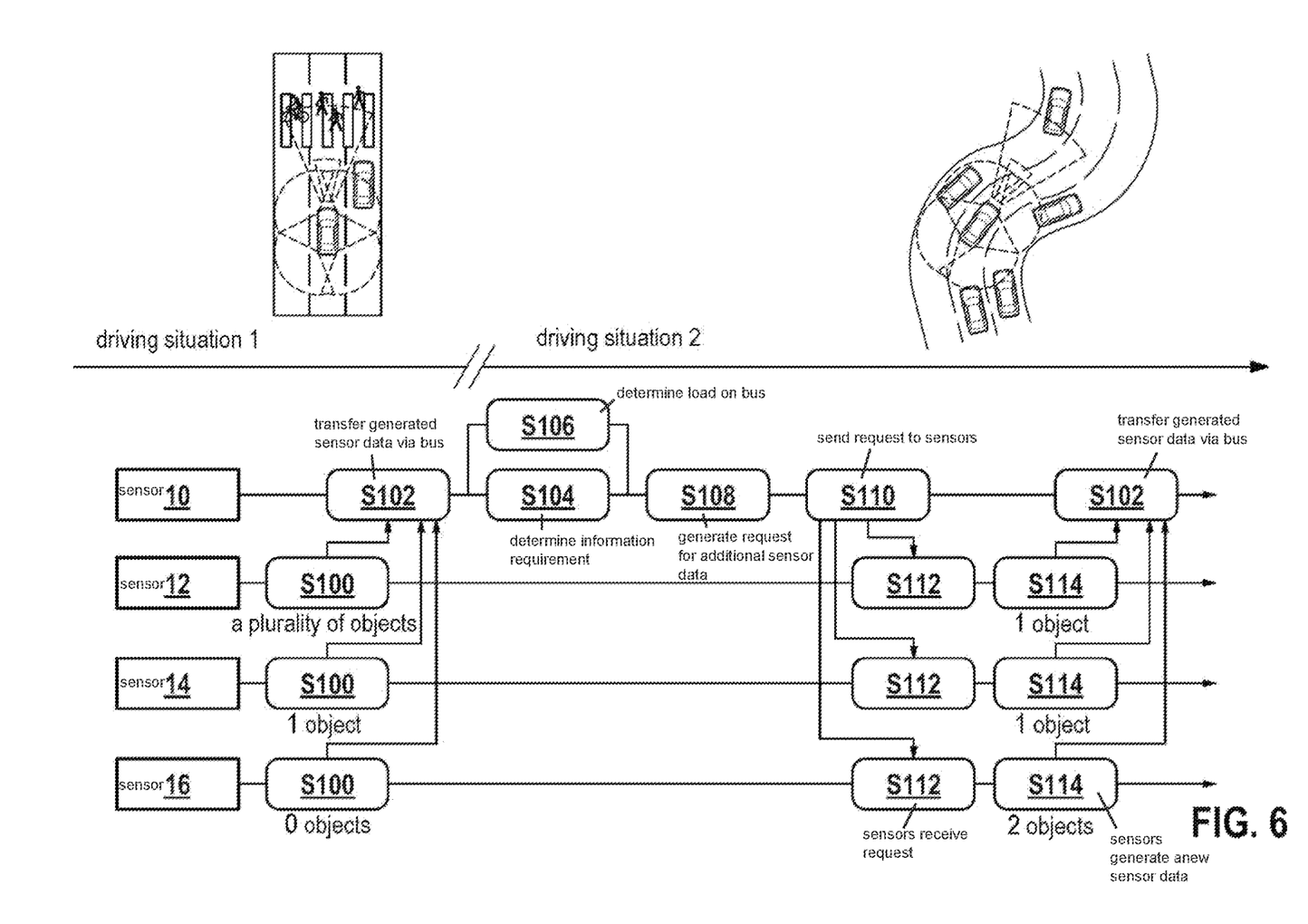

In this cycle, the sensors 12, 14, 16 transmit with priority to the processing unit 10 the number of objects they have detected, which the processing unit receives in step S102. Taking into account the transferred sensor data, which represents the numbers of objects detected by the various sensors 12, 14, 16, the processing unit 10 determines in the next step S104 the additional information requirement and simultaneously estimates in step S106 the load on the bus 24 by this transfer of sensor data. The request for additional sensor data for a subsequent request cycle for sensor data is generated in step S108 on the basis of the determined information requirement and the load on the bus 24. This subsequent cycle starts with step S110, in which the request generated in step S108 is transferred to the sensors 12, 14, 16.

At this point in time, the driving situation of the vehicle has altered in accordance with FIG. 4 (labeled "driving situation 2" in FIG. 6). After receiving the request (step S112), the sensors 12, 14, 16 detect in step S114 sensor data that corresponds to the altered situation in the surroundings. The sensor 12 now detects the third-party vehicle 70, the sensor 14 detects the additional vehicle 66, and the sensor 16 detects the vehicles 62 and 64. The detected numbers of these objects (for sensor 12: one object, for sensor 14: one object, for sensor 16: two objects) are transferred via the bus 24 to the processing unit 10 (step S102).

Figure 7:
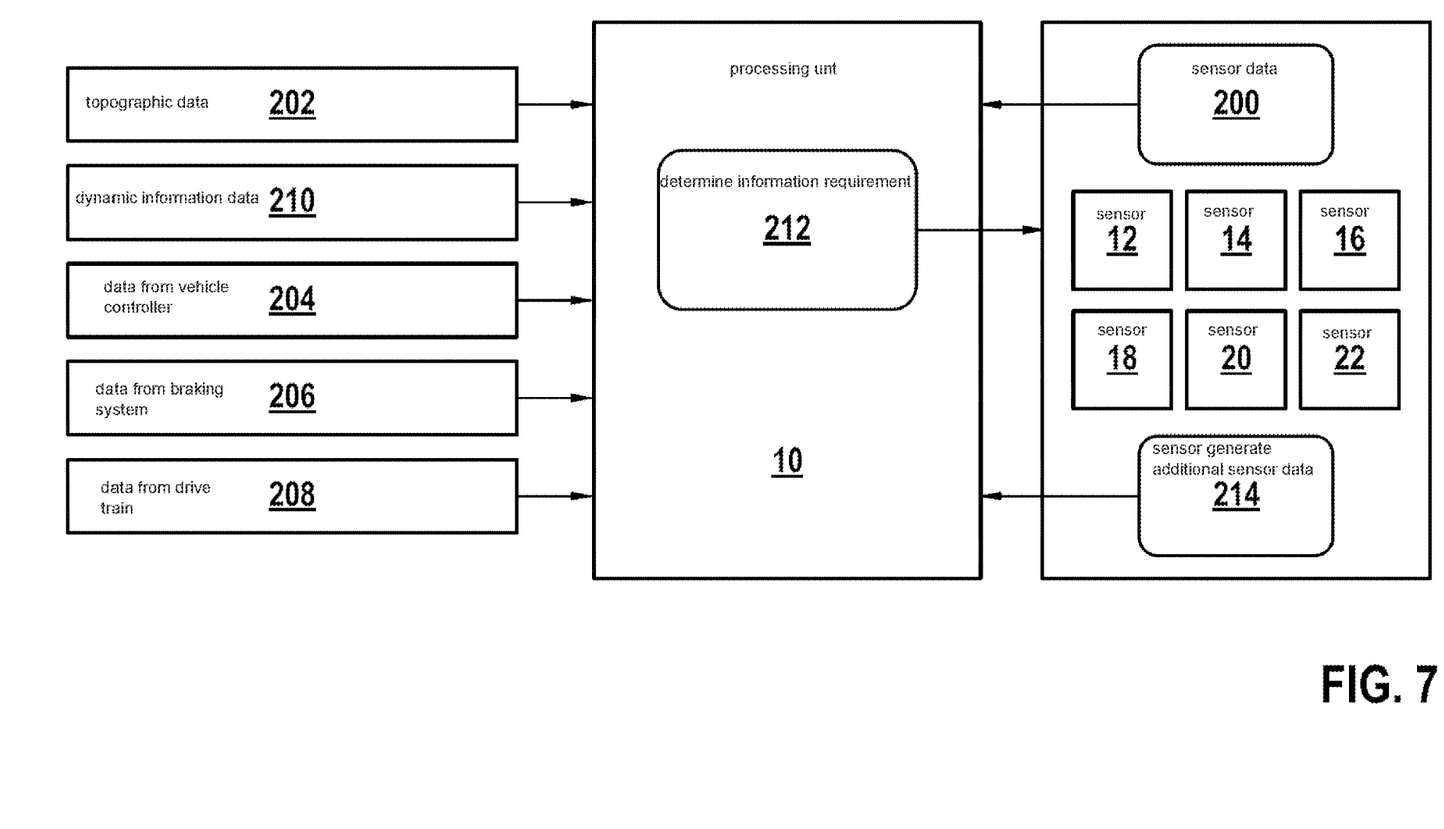
FIG. 7 is a further schematic diagram of details of the method according to the present invention.

The diagram in FIG. 7 shows details for determining the information requirement by the processing unit 10 and for producing the request for sensor data.

In addition to the sensor data 200 originating from the sensors 12, 14, 16, the processing unit 10 can also use topographic data 202 that describes a movement space in which the subject motor vehicle 26 is located. This topographic data represents a type of map, on which the vehicle 26 is moving. This map can contain elements that are particularly relevant to assessing the driving situation, for instance peculiarities in the course of the road, hazard points or the like.

In addition, vehicle data that describes internal states of the motor vehicle 26 can be incorporated in determining the information requirement. Said vehicle data may be, for example, data from the vehicle controller 204, data from the braking system 206 or data from the drive train 208. Dynamic information data 210 about the movement of the motor vehicle 26 can also be incorporated.

From this data 200, 202, 204, 206, 208, 210, the processing unit 10 determines the information requirement 212 and, taking into account the load on the bus 24, a request 212 for additional sensor data, as described above, which request is sent to the sensors 12, 14, 16, 18, 20, 22. This sensor data may be, or specify, for example, numbers of detected objects, and/or may represent, for instance, also the occurrence of a specific event. On the basis of this request 212, the sensors 12, 14, 16, 18, 20, 22 generate additional sensor data 214 and send this data back to the processing unit 10.

What is claimed is:

1. A method for situation-based processing of sensor data from a motor vehicle, comprising:
   transferring sensor data generated by sensors relating to a situation in surroundings of the motor vehicle to a processing unit via a bus;
   determining, by the processing unit, an information requirement, the processing unit taking into account the transferred sensor data in the determining of the information requirement;
   generating a request for additional sensor data based on the determined information requirement and a load on the bus; and
   sending, by the processing unit, the request to the sensors.

2. The method as recited in claim 1, wherein the sensor data is transferred cyclically to the processing unit, and the request for sensor data is generated in each cycle based on the information requirement that was determined from the sensor data that was transferred to the processing unit in a preceding cycle, and based on the load on the bus in the preceding cycle.

3. The method as recited in claim 1, wherein each individual sensor of the sensors monitors a specific zone of the vehicle surroundings.

4. The method as recited in claim 1, wherein the request contains a prioritization of specific sensors such that sensor data from prioritized sensors is transferred with priority to the processing unit.

5. The method as recited in claim 1, wherein the request contains a prioritization of specific data content of the sensor data over other data content such that prioritized data content is transferred with priority to the processing unit.

6. The method as recited in claim 5, wherein the sensor data contains at least a number of detected objects, and the number of detected objects constitutes a prioritized data content.

7. The method as recited in claim 5, wherein the sensor data represents an occurrence of a specific event, and the occurrence of the specific event constitutes a prioritized data content.

8. The method as recited in claim 1, wherein vehicle data describing internal states of the motor vehicle is also taken into account in determining the information requirement.

9. The method as recited in claim 1, wherein topographic data describing a movement space in which the motor vehicle is located is taken into account in determining the information requirement.

10. A device for situation-based processing of sensor data from a motor vehicle, comprising:
    a processing unit;
    a number of sensors configured to monitor surroundings of the motor vehicle; and
    a bus which connects the sensors to the processing unit;
    wherein the sensors are configured to generate sensor data relating to a situation in the surroundings of the motor vehicle, and to transfer the sensor data to the processing unit via the bus, and the processing unit is configured to take into account the transferred sensor data to determine an information requirement, and to generate at least one request for additional sensor data based on the determined information requirement and a load on the bus, and to send the request to the sensors.

\* \* \* \* \*